June 9, 1925.
H. R. ROCKWELL
BLOW-OFF VALVE
Filed May 12, 1923
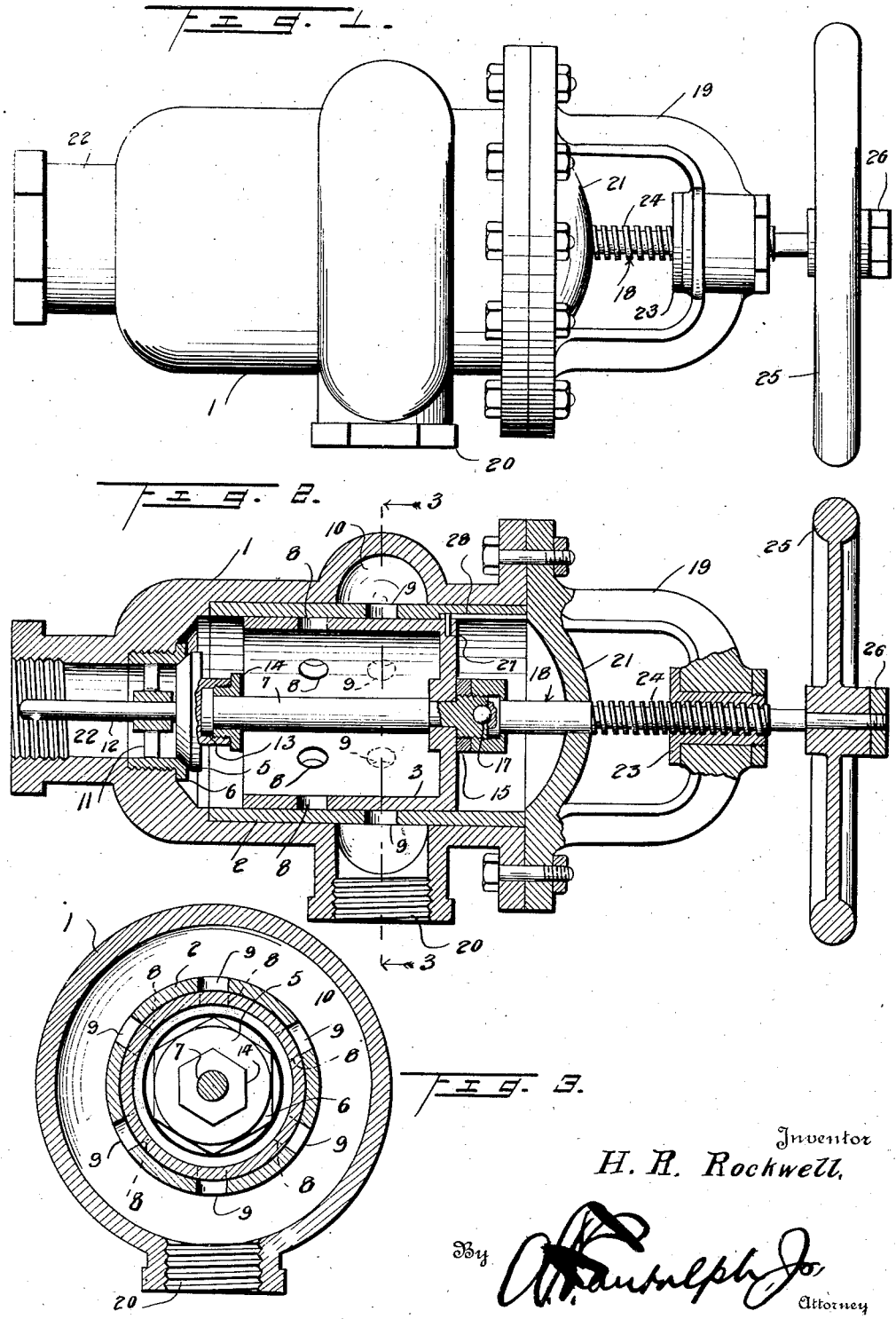

Patented June 9, 1925.

1,540,954

UNITED STATES PATENT OFFICE.

HUBERT R. ROCKWELL, OF ST. LOUIS, MISSOURI.

BLOW-OFF VALVE.

Application filed May 12, 1923. Serial No. 638,557.

*To all whom it may concern:*

Be it known that I, HUBERT R. ROCKWELL, a citizen of the United States, residing at St. Louis, in the county of St. Louis and State of Missouri, have invented certain new and useful Improvements in Blow-Off Valves; and I do hereby declare the following to be a full, clear, and exact description of the invention, such as will enable others skilled in the art to which it appertains to make and use the same.

Blow-off valves as ordinarily constructed for steam boilers are of the disk type and during the initial unseating of the valve and the final closing of the same upon its seat, the rush of water is such as to cut both the valve and its seat and result in a leak which to repair entails considerable trouble and loss of time and frequently necessitating the shutting down of the boiler.

The present invention has for its object to provide a blow-off valve which enables the full unseating of the disk valve and the full seating thereof before the outlet is uncovered and after such outlet has been closed, this being effected by a supplemental valve mechanism adjunctive to and cooperating with the usual disk valve.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of a blow-off valve embodying the invention,

Figure 2 is a central longitudinal section of the valve, and

Figure 3 is a transverse section on the line 3—3 of Figure 2.

Corresponding and like parts are referred to in the following description and designated in the several views of the drawings by like reference characters.

The valve comprises a casing 1 having an inlet 22 and an outlet 20. The casing 1 is formed intermediate its ends with an annular enlargement forming a chamber 10 which is in communication with the outlet 20. A bonnet 21 closes one end of the casing and a guide or yoke 19 forming a part of the bonnet receives the outer section 18 of the valve stem, said section being provided with screw threads 24 which cooperate with corresponding threads of a bushing 23 secured in an opening formed in the outer end of the guide or yoke 19. A hand wheel 25 secured to the outer end of the stem 18 by means of a nut 26, provides convenient means for rotating the stem to effect opening and closing of the valve.

A bushing 6 is threaded into the inner end of the inlet 22 and provides a seat for a disk valve 5, the stem 12 of the valve being mounted in a guide 11 carried by the bushing 6. A stem 7 having a head 13, is secured in the valve 5 by means of a nut 14, which is threaded into a socket forming a part of the valve 5 and receiving the head 13. The inner end of the stem 18 is formed with a head and a union connects the adjacent ends of the stems 7 and 18 by means of a swivel joint, a ball 17 being interposed between the adjacent ends of the stems to reduce the friction to the smallest amount possible. Rotation of the stem 18 effects a movement of the valve 5, whereby the same may be seated or unseated as required. The swivel joint connection between the stems 7 and 18 admits of the latter rotating without producing a corresponding rotation of the stem 7, hence the valve 5 does not rotate upon its seat.

A lining 2 is snugly fitted within the casing 1 and extends across and closes the inner open side of the annular chamber 10. This lining preferably consists of phosphor-bronze and is pressed into the casing so as to be incapable of movement after being positioned. A plurality of openings 9 are formed in the side of the lining 2 opposite the annular chamber 10, whereby to establish communication between the interior of the casing 1 and the chamber 10. A cylindrical valve 3 snugly fits within the lining 2 and is attached to the stem 7 to move therewith, being clamped to said stem by means of a nut 15. A pin 27 projecting laterally from the cylindrical valve 3, enters a longitudinal groove 28 formed in the inner side of the lining 2 and prevents rotation of the valve 3. Openings 8 are formed in the sides of the valve 3 in coincident relation to register with the openings 9 when the valve 3 is moved outward in the casing 1 to the limit of its movement. When the valve 3 is moved inward to the limit of its throw to effect a seating of the disk valve 5, the openings 8 are out of register with the openings 9. In the operation of the valve, the disk valve 5 is wholly unseated before the openings 8 of the valve 3 are brought in register with the openings 9 of the lining 2, whereby an outlet is had for the discharge of the water when blowing the boiler. It will also be understood that the outlet is closed before the disk valve 5 is seated, and as a result there is no constricted space between the valve 5 and its seat either in the initial opening of the valve or the final closing thereof, hence neither the valve 5 or its seat is subjected to appreciable wear by the rush of water which is destructive to blow-off valves as ordinarily constructed and which leak and require frequent repairs.

What is claimed is:

1. A blow off valve having a casing, said casing having an inlet and an outlet, a disk valve for said inlet, a cylindrical valve for the outlet connected to the disk valve, means having swivel connection with said valves to operate them simultaneously, the cylindrical valve being adapted to establish communication with the outlet after unseating of the disk valve, and means to prevent turning movement of the cylindrical valve relatively to the casing.

2. A blow off valve having a casing, said casing having an inlet and an outlet, a lining within said casing having ports in communication with the outlet, a disk valve for the inlet, a cylindrical valve within the lining, said cylindrical valve having ports therethrough, a stem carried by the cylindrical valve and mounting the disk valve, and a stem swiveled to said stem to slide the cylindrical valve so as to cause the ports to register after unseating of the disk valve.

In testimony whereof I affix my signature in presence of two witnesses.

HUBERT R. ROCKWELL.

Witnesses:
 H. R. ROCKWELL, Jr.,
 CHAS. F. RAUCH.